(12) United States Patent
Komada et al.

(10) Patent No.: US 10,358,183 B2
(45) Date of Patent: Jul. 23, 2019

(54) HYDRAULIC OPERATING APPARATUS

(71) Applicant: SHIMANO INC., Sakai, Osaka (JP)

(72) Inventors: Yasuyuki Komada, Sakai (JP); Takuma Sakai, Sakai (JP); Mototsugu Nakai, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/685,637

(22) Filed: Aug. 24, 2017

(65) Prior Publication Data

US 2019/0061869 A1    Feb. 28, 2019

(51) Int. Cl.
  *B62L 3/02* (2006.01)
  *B60T 7/10* (2006.01)
  *B62K 23/06* (2006.01)
  *B60T 11/22* (2006.01)

(52) U.S. Cl.
  CPC .............. *B62L 3/023* (2013.01); *B60T 7/102* (2013.01); *B60T 11/22* (2013.01); *B62K 23/06* (2013.01)

(58) Field of Classification Search
  CPC .. B62L 3/023; B62L 3/02; B60T 11/22; B60T 7/102; B62K 23/06
  USPC ........................................ 188/344, 24.11, 26
  See application file for complete search history.

(56) References Cited

U.S. PATENT DOCUMENTS

| | | | |
|---|---|---|---|
| 4,542,624 A * | 9/1985 | Mizusaki | B60T 11/26 60/535 |
| 7,178,646 B2 * | 2/2007 | Lumpkin | B60T 7/102 188/24.11 |
| 7,540,147 B2 * | 6/2009 | Takizawa | B60T 7/10 60/588 |
| 7,578,375 B2 * | 8/2009 | Lin | B60T 7/10 188/344 |
| 8,146,716 B2 * | 4/2012 | Siew | B60T 11/22 188/24.22 |
| 8,342,305 B2 * | 1/2013 | Moore | B60T 11/16 188/24.22 |
| 8,448,762 B2 * | 5/2013 | Hirose | B60T 11/16 188/24.11 |
| 8,905,205 B2 * | 12/2014 | Matsushita | B62K 23/06 188/344 |
| 9,415,831 B2 * | 8/2016 | Kariyama | B62L 3/023 |
| 9,937,978 B2 * | 4/2018 | Miki | B62K 23/06 |
| 10,144,484 B2 * | 12/2018 | Kariyama | B62K 23/06 |

(Continued)

*Primary Examiner* — Thomas J Williams (74) *Attorney, Agent, or Firm* — Oliff PLC (57) ABSTRACT

A hydraulic operating apparatus for a small vehicle, including a bicycle, comprises a housing, a piston, a mounting assembly, a lever, and a fluid reservoir tank. The housing includes a cylinder bore extending along a cylinder axis. The piston is movably disposed within the cylinder bore. The mounting assembly is configured to mount the housing to a handlebar of the small vehicle. The mounting assembly defines a handlebar mounting axis that is not perpendicular to the cylinder axis in a mounted state where the housing is mounted to the handlebar. The lever is pivotally mounted to the housing and configured to move the piston within the cylinder bore in response to a movement of the lever. The fluid reservoir tank has a lid opening. The lid opening is configured to face a center plane that passes through a geometric center of the handlebar and that is perpendicular to the handlebar mounting axis, in the mounted state.

20 Claims, 4 Drawing Sheets

(56) References Cited

U.S. PATENT DOCUMENTS

2004/0045775 A1* 3/2004 Lavezzi .................. B60T 11/16
                                                          188/24.11
2018/0141611 A1* 5/2018 Komada ................ B62K 23/06

* cited by examiner

HYDRAULIC OPERATING APPARATUS

BACKGROUND

In recent years, some high performance small vehicles, in particular bicycles, have been provided with hydraulic brake systems to increase braking performance. In the case of bicycles, the hydraulic brake systems are typically actuated by a hydraulic operating apparatus such as a brake lever that is attached to the handlebar. The hydraulic operating apparatus typically includes a master piston that is slidably disposed in a cylinder bore of a master cylinder, and which is actuated by a lever. The master cylinder is in fluid communication with a reservoir containing hydraulic fluid.

SUMMARY

In the bicycle market, there is demand to improve such hydraulic operating apparatus in aspects of size, weight, appearance, ease of construction, and so on. In particular, there exists a need for a brake lever apparatus for a small vehicle like a bicycle that reduces the number of overall parts for easy and economical construction, and arranges the parts to both improve reliability and ease maintenance. Exemplary embodiments of the inventive hydraulic operating apparatus for the small vehicle described herein address one or more of these needs. For example, exemplary embodiments provide a hydraulic operating apparatus that orients the master cylinder in a way that reduces the overall number of parts, improves reliability, and/or eases maintenance.

According to a first aspect of one or more exemplary embodiments, a hydraulic operating apparatus for a small vehicle, including a bicycle, is provided including a housing, a piston, a mounting assembly, a lever, and a fluid reservoir tank. The housing includes a cylinder bore extending along a cylinder axis. The piston is movably disposed within the cylinder bore of the housing. The mounting assembly is configured to mount the housing to a handlebar of the small vehicle. The mounting assembly defines a handlebar mounting axis that is not perpendicular to the cylinder axis in a mounted state where the housing is mounted to the handlebar. The lever is pivotally mounted to the housing and configured to move the piston within the cylinder bore in response to a movement of the lever. The fluid reservoir tank has a lid opening. The fluid reservoir tank defines a reservoir axis passing through the lid opening. The lid opening is configured to face a center plane that passes through a geometric center of the handlebar and that is perpendicular to the handlebar mounting axis, in the mounted state.

According to this configuration, the lid opening faces towards a center of the handlebar rather than towards an outside. This reduces the likelihood that debris will collect in or around the opening if the small vehicle falls over. Reducing the likelihood that debris will collect in or around the opening maintains peak performance of the hydraulic operating apparatus and makes cleaning and/or maintenance of the hydraulic operating apparatus easier.

According to a second aspect of one or more exemplary embodiments, a hydraulic operating apparatus for a small vehicle, including a bicycle, is provided including a piston, a housing, a mounting assembly, a lever, and a fluid reservoir tank. The housing includes a cylinder bore within which the piston is movably disposed, and a hose attachment opening located at an end of the cylinder bore axially opposite the piston. The hose attachment opening is configured to connect to a hydraulic hose and face a reference plane. The mounting assembly is configured to mount the housing to a handlebar of the small vehicle. The mounting assembly defines a handlebar mounting axis in a mounted state where the housing is mounted to the handlebar. The lever is pivotally mounted to the housing and configured to move the piston within the cylinder bore in response to a movement of the lever. The fluid reservoir tank has a lid opening. The fluid reservoir tank defines a reservoir axis passing through the lid opening. The lid opening is configured to face the reference plane.

According to this configuration, the lid opening and the hose attachment opening both face the same reference plane. Because the hydraulic hose connects to a braking apparatus on wheels located along a central axis of the small vehicle, the hose attachment opening opens towards a general center of the small vehicle. This means that the lid opening also opens towards a general center of the small vehicle. This reduces the likelihood that debris will collect in or around the opening if the of the small vehicle falls over. Reducing the likelihood that debris will collect in or around the opening maintains peak performance of the hydraulic operating apparatus and makes cleaning and/or maintenance of the hydraulic operating apparatus easier.

According to a third aspect of one or more exemplary embodiments, the hydraulic operating apparatus according to the second aspect is configured so that the cylinder bore extends along a cylinder axis. The handlebar mounting axis is non-perpendicular to the cylinder axis in the mounted state. The reference plane is a center plane that passes through a geometric center of the handlebar and that is perpendicular to the handlebar mounting axis, in the mounted state.

This configuration provides a lid opening that opens generally towards a center of the handlebar to achieve one or more of the above-identified advantages.

According to a fourth aspect of one or more exemplary embodiments, the hydraulic operating apparatus according to the first or third aspect is configured so that the lid opening is located at an end of the fluid reservoir tank. The fluid reservoir tank has a bottom end opposite to the lid opening along the reservoir axis. The bottom end is farther from the center plane than the lid opening.

This configuration provides a lid opening that opens generally towards a center of the handlebar and a bottom end that extends generally away from the center to achieve one or more of the above-identified advantages.

According to a fifth aspect of one or more exemplary embodiments, the hydraulic operating apparatus according to any of the first through fourth aspects further comprises a diaphragm that is disposed within the fluid reservoir tank so as to provide a hydraulic fluid chamber between the diaphragm and the fluid reservoir tank. The hydraulic operating apparatus also includes a lid closing the lid opening of the fluid reservoir tank so as to provide an air chamber between the lid and the diaphragm. The lid includes a vent that allows air into the air chamber.

This configuration allows air to easily enter the fluid reservoir tank on one side of the diaphragm when hydraulic fluid leaves the fluid reservoir tank on the other side of diaphragm. Further, having the vent facing a general center of the small vehicle or a general center of the handlebar reduces the likelihood that debris will collect in or around the vent if the small vehicle falls over, thereby achieving one or more of the above-identified advantages.

According to a sixth aspect of one or more exemplary embodiments, the hydraulic operating apparatus according to any of the first through fifth aspects further comprises a first port configured to communicate hydraulic fluid between the fluid reservoir tank and the cylinder bore.

This configuration allows for hydraulic fluid to flow between the fluid reservoir tank and the cylinder bore to replenish hydraulic fluid in the remainder of the braking system.

According to a seventh aspect of one or more exemplary embodiments, the hydraulic operating apparatus according to the sixth aspect further comprises a bleed port and a second port configured to communicate hydraulic fluid between the fluid reservoir tank and the cylinder bore. The fluid reservoir tank includes the lid opening, the first port, the second port, and the bleed port without including any other openings. A central axis of the first port and a central axis of the second port each pass through the bleed port.

This configuration allows for hydraulic fluid to even more effectively flow between the fluid reservoir tank and the cylinder bore to replenish hydraulic fluid in the remainder of the braking system. This configuration also allows both ports to be formed by a tool passing through the opening of the single bleed port during construction of the hydraulic operating apparatus, thereby reducing the overall number of openings and/or parts.

According to an eighth aspect of one or more exemplary embodiments, the hydraulic operating apparatus according to any of the first through seventh aspects is configured so that the fluid reservoir tank is cylindrical.

With this configuration, it is possible to easily provide the fluid reservoir tank.

According to an ninth aspect of one or more exemplary embodiments, the hydraulic operating apparatus according to any of the first through eighth aspects is configured so that a width of the lid opening is smaller than a length of the fluid reservoir tank in the direction of the reservoir axis.

With this configuration, it is possible to provide the fluid reservoir tank having a large capacity and a good appearance.

According to a tenth aspect of one or more exemplary embodiments, the hydraulic operating apparatus according to any of the first through ninth aspects is configured so that the reservoir axis is parallel to or oblique to the cylinder axis of the cylinder bore.

With this configuration, it is possible to obtain a clean appearance between the housing and the fluid reservoir tank.

According to an eleventh aspect of one or more exemplary embodiments, the hydraulic operating apparatus according to the tenth aspect is configured so that the reservoir axis is oblique to the cylinder axis of the cylinder bore.

With this configuration, it is possible to make a bleeding operation easy.

According to a twelfth aspect of one or more exemplary embodiments, the hydraulic operating apparatus according to any of the first through eleventh aspects is configured so that the reservoir axis is perpendicular to or oblique to the respective center plane or reference plane.

With this configuration, it is possible to make the hydraulic operating apparatus compact in a longitudinal direction of the small vehicle.

According to a thirteenth aspect of one or more exemplary embodiments, the hydraulic operating apparatus according to the twelfth aspect is configured so that the reservoir axis is oblique to the respective center plane or reference plane.

With this configuration, it is possible to make a bleeding operation easy.

According to a fourteenth aspect of one or more exemplary embodiments, the hydraulic operating apparatus according to any of the first through thirteenth aspects is configured so that the reservoir axis is parallel to or oblique to the handlebar mounting axis of the mounting assembly.

With this configuration, it is possible to make the hydraulic operating apparatus compact in a longitudinal direction of the small vehicle.

According to a fifteenth aspect of one or more exemplary embodiments, the hydraulic operating apparatus according to the fourteenth aspect is configured so that the reservoir axis is oblique to the handlebar mounting axis of the mounting assembly.

With this configuration, it is possible to make a bleeding operation easy.

According to a sixteenth aspect of one or more exemplary embodiments, the hydraulic operating apparatus according to the fourteenth or fifteenth aspect is configured so that the mounting assembly includes a first clamp part and a second clamp part. The first clamp part is hingedly connected to the second clamp part.

With this configuration, it is possible to easily mount the hydraulic operating apparatus to the handlebar.

According to a seventeenth aspect of one or more exemplary embodiments, the hydraulic operating apparatus according to the sixteenth aspect is configured so that the first clamp part and the second clamp part are provided as separate members with respect to the housing.

With this configuration, it is possible to easily provide the first clamp part and the second clamp part.

According to an eighteenth aspect of one or more exemplary embodiments, the hydraulic operating apparatus according to the sixteenth or seventeenth aspect is configured so that the mounting assembly includes a coupling part disposed on the housing so as to couple the first clamp part to the second clamp part.

With this configuration, it is possible to stably couple the first clamp part to the second clamp part via the coupling part.

These and other objects, features, aspects and advantages will become apparent to the skilled artisan from the following detailed description, which taken in conjunction with the annexed drawings, discloses details of certain exemplary embodiments.

BRIEF DESCRIPTION OF THE DRAWINGS

Exemplary embodiments are described below with reference to the following drawings.

DETAILED DESCRIPTION OF EXEMPLARY EMBODIMENTS

It will be apparent to the skilled artisan in the small vehicle field, and in particular the bicycle field, from this disclosure that the following descriptions of exemplary embodiments are provided as examples only and need not limit the broad inventive principles described herein or included in the appended claims. The term "small vehicle," as used herein, refers to electric and non-electric vehicles regardless of the number of their wheels, but does not include four-wheeled vehicles having an internal combustion engine as a power source for driving the wheels, or four-wheeled electric vehicles that require a license to operate on public roads.

Figure 1:
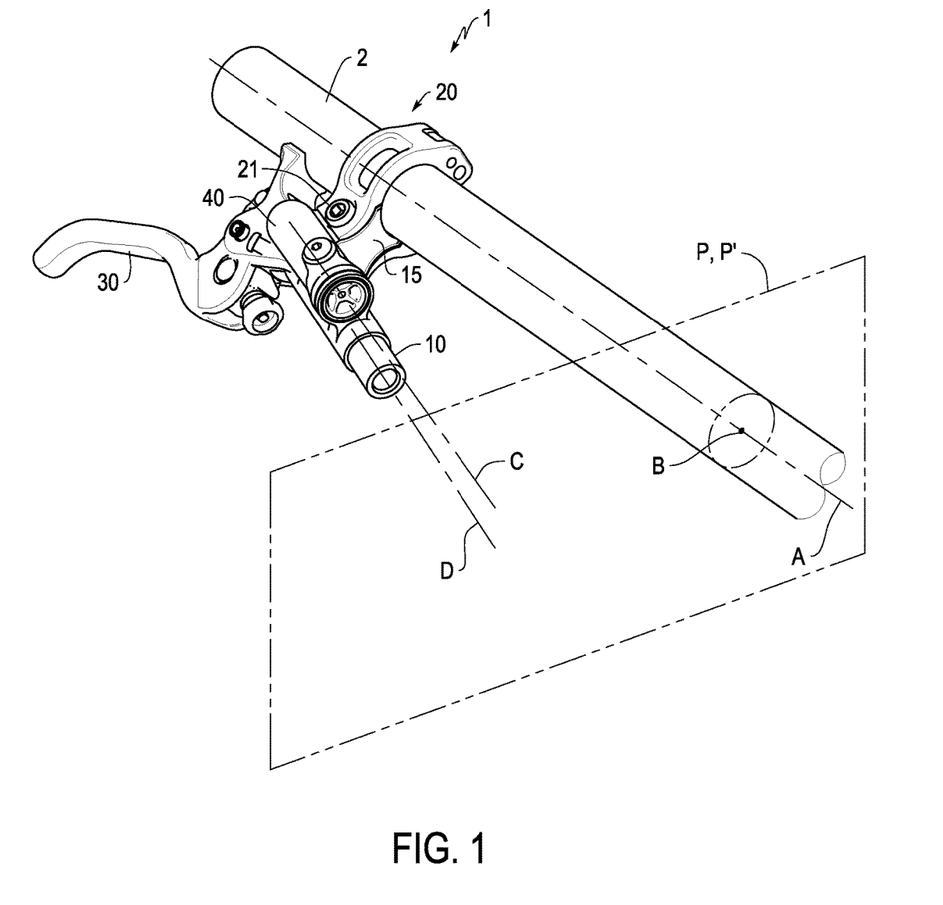
FIG. 1 depicts first and second embodiments of a hydraulic operating apparatus mounted on a handlebar.
Figure 2:
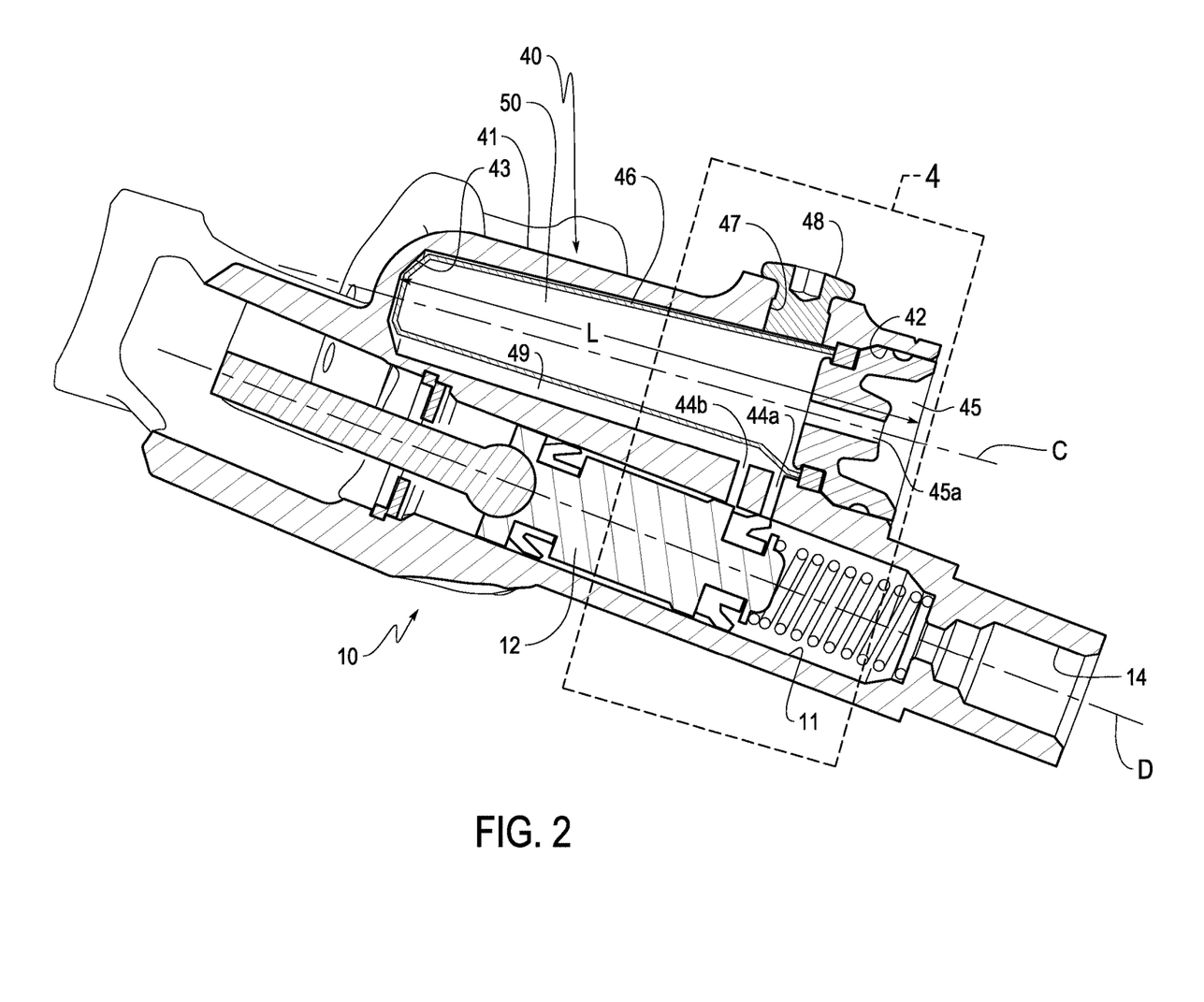
FIG. 2 is a cross sectional view of selected main parts of the hydraulic operating apparatus illustrated in FIG. 1.
Figure 3:
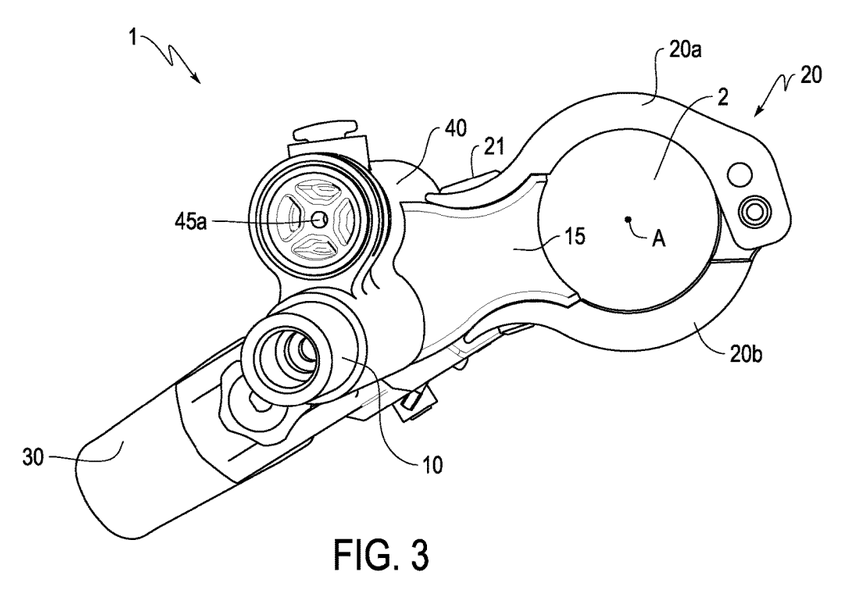
FIG. 3 depicts the hydraulic operating apparatus illustrated in FIGS. 1 and 2 viewed along the handlebar mounting axis.

FIGS. 1 and 2 depict a first exemplary embodiment of a hydraulic operating apparatus 1. The hydraulic operating apparatus 1 is typically mounted to a handlebar 2. As shown in FIGS. 1 and 2, the hydraulic operating apparatus 1 includes a brake lever housing 10 having a cylinder bore 11. The cylinder bore 11 has a cylinder axis D that extends longitudinally through the center of the cylinder bore 11 and along the longest direction of the cylinder bore 11. In FIGS. 1-3, the cylinder bore 11 is shown in the form of circular cylinder. But this embodiment is not limited to such a shape. According to this embodiment, the cylinder bore 11 could take the form of a non-circular cylinder. A piston 12 is movably disposed within the cylinder bore 11.

The hydraulic operating apparatus 1 further includes a mounting assembly 20 for mounting the brake lever housing 10 to the handlebar 2. As shown in FIGS. 1 and 3, the mounting assembly 20 defines a cylindrical opening that contains the handlebar 2 when the mounting assembly 20 is mounted to the handlebar 2. The cylindrical opening defines a mounting axis A that passes through a center of the cylindrical opening and along an axial direction of the cylindrical opening. When the mounting assembly 20 is mounted to a straight handlebar 2, as in the present embodiment, the mounting axis A corresponds to a central axis of the handlebar 2. However, if the mounting assembly 20 is mounted to a non-straight handlebar, the mounting axis A corresponds to a central axis of only the portion of the handlebar 2 to which the mounting assembly 20 is mounted.

As shown in FIGS. 1 and 3, the hydraulic operating apparatus 1 further includes a lever 30 that is pivotally mounted to the brake lever housing 10. While the hydraulic operating apparatus 1 is mounted to the handlebar 2 by the mounting assembly 20, pulling the lever 30 backward causes the piston 12 to move within in the cylinder bore 11 to force the hydraulic fluid out of the cylinder bore 11, thereby performing a frictional braking operation.

The brake lever housing 10 of the hydraulic operating apparatus 1 further includes an internal fluid reservoir tank 40 in fluid communication with the cylinder bore 11 via ports 44a, 44b for communicating a hydraulic fluid. The fluid reservoir tank 40 has a lid opening 42 at one end. The fluid reservoir tank 40 has a reservoir axis C that extends longitudinally through the center of the fluid reservoir tank 40, along the longest direction of the fluid reservoir tank 40, and through the lid opening 42.

According to the first exemplary embodiment, as shown in FIG. 1, when the mounting assembly 20 is mounted to the handlebar 2, the lid opening 42 faces an imaginary center plane P that passes through the geometric center B of the handlebar 2, and is perpendicular to the mounting axis A. As used herein, the term "faces" encompasses both squarely facing and obliquely facing (as shown in FIG. 1). According to this arrangement, the lid opening 42 opens toward a general center of the small vehicle rather than toward an outside of the small vehicle.

According a second exemplary embodiment, the cylinder bore 11 includes a hose attachment opening 14 located at an end of the cylinder bore 11 opposite the piston 12 in the direction of the cylinder axis D. That is, the hose attachment opening 14 is axially opposite the piston 12. The hose attachment opening 14 is configured to connect to a hydraulic hose (not shown) that communicates hydraulic fluid to a frictional braking device (not shown). As shown in FIG. 1, the hose attachment opening 14 is oriented to face an imaginary reference plane P'. Although an example of the reference plane P' is shown in FIG. 1 as being located at the geometric center B of the handlebar 2 and oriented perpendicular to the mounting axis A, it is not so limited in this embodiment. The reference plane P' of the second embodiment can be located at any location and oriented at any orientation as long as the reference plane P' is both located and oriented so that the hose attachment opening 14 faces it. A characteristic feature of this second exemplary embodiment is that, instead of facing center plane P, the lid opening 42 of the second embodiment faces reference plane P'.

In FIGS. 1-3, an example of the fluid reservoir tank 40 is shown having a circular cylindrical shape and being oriented alongside the cylinder bore 11. However, in either of the first or second embodiments, the fluid reservoir tank 40 can be in the form of a non-circular cylinder or a non-cylindrical shape.

Figure 4:
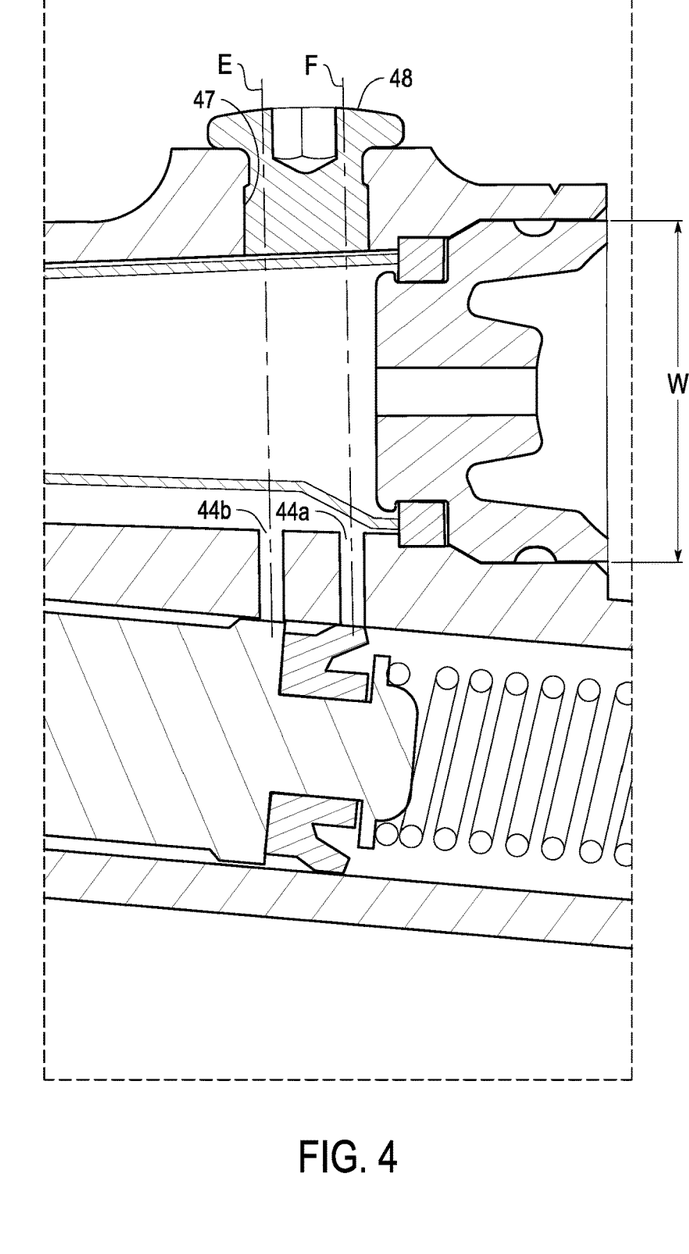
FIG. 4 is an enlargement of area 4 in FIG. 2.

As shown in FIGS. 2 and 4, according to either exemplary embodiment, a width W of the lid opening 42 may be smaller than a length L of the fluid reservoir tank 40 in a direction of the reservoir axis C. As shown in FIG. 1, in each of the first and second embodiments, the handlebar mounting axis A can be oriented so that it is not perpendicular to the cylinder axis D. Further, although in each of the first and second embodiments, the reservoir axis C is shown in FIGS. 1 and 2 as being oblique to the cylinder axis D, in either embodiment, the reservoir axis C can be parallel to the cylinder axis D. Similarly, although in each of the first and second embodiments, the reservoir axis C is shown in FIG. 1 as being oblique to the handlebar mounting axis A, in either embodiment, the reservoir axis C can be parallel to the handlebar mounting axis A. Also, although in each of the first and second embodiments, the reservoir axis C is shown in FIG. 1 as being oblique to the respective center plane P or reference plane P', in either embodiment, the reservoir axis C can be perpendicular to the respective center plane P or reference plane P'.

As shown in FIG. 2, according to either exemplary embodiment, the fluid reservoir tank 40 can have a bottom end 43 opposite to the lid opening 42 in a direction of the reservoir axis C. The bottom end 43 is located farther from the center plane P (first embodiment) or reference plane P' (second embodiment) than the lid opening 42. Further, as shown in FIG. 2, according to either exemplary embodiment, a flexible diaphragm 46 can be disposed within the fluid reservoir tank 40 so as to provide a hydraulic fluid chamber 49 between the diaphragm 46 and the fluid reservoir tank 40 that contains hydraulic fluid. A removable lid 45 can be provided closing the lid opening 42 of the fluid reservoir tank 40 so as to provide an air chamber 50 between the lid 45 and the diaphragm 46. The lid 45 can include a vent 45a that allows air into the air chamber 50. This way, the diaphragm 46 separates the hydraulic fluid from the air chamber 50 containing air that communicates with an outside of the fluid reservoir tank 40 through the vent 45a. Due to the flexibility of the diaphragm 46, when hydraulic fluid exits the hydraulic fluid chamber 49 via ports 44a, 44b, the air chamber 50 can expand by receiving air through the vent 45a to compensate for the reduced volume of the hydraulic fluid chamber 49.

According to both the first and second embodiments, the ports 44a, 44b are positioned adjacent the lid opening 42 to fluidly connect the hydraulic fluid chamber 49 within the fluid reservoir tank 40 to the cylinder bore 11 when the piston is retracted because the lever 30 has not been pulled backward. Although the first and second embodiments include two ports 44a, 44b, to maximize hydraulic fluid flow and to compensate for any blockage, only one port 44a is necessary. Thus, either of the embodiments could exclude either port 44a or port 44b.

According to both the first and second embodiments, the hydraulic operating apparatus 1 can further include a bleed port 47, with a cap 48. The bleed port 47 can be opened to allow any air that has entered the hydraulic fluid chamber 49 to escape. Further, as shown in FIG. 4, a central axis F of port 44a and a central axis E of port 44b each pass through the bleed port 47. According to this configuration, during manufacture, the bleed port provides an entry point for tools used to make the ports 44a, 44b.

As shown in FIG. 3, in either exemplary embodiment, the mounting assembly 20 can include a first clamp part 20a and a second clamp part 20b. The first clamp part 20a is hingedly connected to the second clamp part 20b. In both embodiments, the first clamp part 20a and the second clamp part 20b can be provided as separate members with respect to the brake lever housing 10 that each connect to an extension 15 of the brake lever housing 10. The mounting assembly 20 can include a coupling part 21 disposed on the extension 15 of the brake lever housing 10 so as to couple the first clamp part 20a to the second clamp part 20b.

In the above description and appended claims, the term "comprising" and its derivatives, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. Terms of degree such as "general" or "generally" are intended to impart a reasonable amount of deviation to the extent that an end result or intended effect is not significantly changed. Further, as used herein, terms "front," "back," "center," "outside," and their derivatives refer to directions as viewed from a state in which a rider of a small vehicle is sitting on a saddle of the vehicle or in a driving position and facing towards the handlebar.

While exemplary embodiments have been described to explain the inventive principles, it will be apparent to a skilled artisan that various changes and modifications can be made herein without departing from the broad inventive principles. For example, the size, shape, location or orientation of the various components can be changed as needed and/or desired. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A hydraulic operating apparatus for a small vehicle, the hydraulic operating apparatus comprising:
   a housing including a cylinder bore extending along a cylinder axis;
   a piston movably disposed within the cylinder bore of the housing;
   a mounting assembly configured to mount the housing to a handlebar of the small vehicle, the mounting assembly defining a handlebar mounting axis that is non-perpendicular to the cylinder axis in a mounted state where the housing is mounted to the handlebar;
   a fluid reservoir tank having a lid opening, the fluid reservoir tank defining a reservoir axis passing through the lid opening, the lid opening being configured to face a center plane that passes through a geometric center of the handlebar and that is perpendicular to the handlebar mounting axis, in the mounted state; and
   a lever pivotally mounted to the housing and configured to move the piston within the cylinder bore in response to a movement of the lever, a free end of the lever facing away from the center plane in the mounted state.

2. A hydraulic operating apparatus for a small vehicle, the hydraulic operating apparatus comprising:
   a piston;
   a housing including:
      a cylinder bore within which the piston is movably disposed; and
      a hose attachment opening located at an end of the cylinder bore axially opposite the piston, the hose attachment opening being configured to connect to a hydraulic hose, the hose attachment opening being configured to face a reference plane;
   a mounting assembly configured to mount the housing to a handlebar of the small vehicle, the mounting assembly defining a handlebar mounting axis in a mounted state where the housing is mounted to the handlebar;
   a lever pivotally mounted to the housing and configured to move the piston within the cylinder bore in response to a movement of the lever; and
   a fluid reservoir tank having a lid opening, the fluid reservoir tank defining a reservoir axis passing through the lid opening, the lid opening being configured to face the reference plane.

3. The hydraulic operating apparatus of claim 2, wherein the cylinder bore extends along a cylinder axis;
   the handlebar mounting axis is non-perpendicular to the cylinder axis in the mounted state; and
   the reference plane is a center plane that passes through a geometric center of the handlebar and that is perpendicular to the handlebar mounting axis, in the mounted state.

4. The hydraulic operating apparatus of claim 1, wherein the lid opening is located at an end of the fluid reservoir tank; and
   the fluid reservoir tank has a bottom end opposite to the lid opening along the reservoir axis, the bottom end being farther from the center plane than the lid opening.

5. The hydraulic operating apparatus of claim 1, further comprising:
   a diaphragm that is disposed within the fluid reservoir tank so as to provide a hydraulic fluid chamber between the diaphragm and the fluid reservoir tank; and
   a lid closing the lid opening of the fluid reservoir tank so as to provide an air chamber between the lid and the diaphragm, the lid including a vent that allows air into the air chamber.

6. The hydraulic operating apparatus of claim 1, further comprising a first port configured to communicate hydraulic fluid between the fluid reservoir tank and the cylinder bore.

7. The hydraulic operating apparatus of claim 6, further comprising:
   a bleed port; and
   a second port configured to communicate hydraulic fluid between the fluid reservoir tank and the cylinder bore;
   wherein:
      the fluid reservoir tank includes the lid opening, the first port, the second port, and the bleed port without including any other openings; and a central axis of the first port and a central axis of the second port each pass through the bleed port.

8. The hydraulic operating apparatus of claim 1, wherein: the fluid reservoir tank is cylindrical.

9. The hydraulic operating apparatus of claim 1, wherein: a width of the lid opening is smaller than a length of the fluid reservoir tank in a direction of the reservoir axis.

10. The hydraulic operating apparatus of claim 1, wherein:
the reservoir axis of the fluid reservoir tank is parallel to or oblique to the cylinder axis of the cylinder bore.

11. The hydraulic operating apparatus of claim 10, wherein:
the reservoir axis of the fluid reservoir tank is oblique to the cylinder axis of the cylinder bore.

12. The hydraulic operating apparatus of claim 1, wherein:
the reservoir axis of the fluid reservoir tank is perpendicular to or oblique to the center plane.

13. The hydraulic operating apparatus of claim 12, wherein:
the reservoir axis of the fluid reservoir tank is oblique to the center plane.

14. The hydraulic operating apparatus of claim 1, wherein:
the reservoir axis of the fluid reservoir tank is parallel to or oblique to the handlebar mounting axis of the mounting assembly.

15. The hydraulic operating apparatus of claim 14, wherein:
the reservoir axis of the fluid reservoir tank is oblique to the handlebar mounting axis of the mounting assembly.

16. The hydraulic operating apparatus of claim 14, wherein:
the mounting assembly includes a first clamp part and a second clamp part, and the first clamp part is hingedly connected to the second clamp part.

17. The hydraulic operating apparatus of claim 16, wherein:
the first clamp part and the second clamp part are provided as separate members with respect to the housing.

18. The hydraulic operating apparatus of claim 16, wherein:
the mounting assembly includes a coupling part disposed on the housing so as to couple the first clamp part to the second clamp part.

19. The hydraulic operating apparatus of claim 1, wherein:
the small vehicle is a bicycle.

20. The hydraulic operating apparatus of claim 2, wherein:
the small vehicle is a bicycle.

* * * * *